Figure 1:
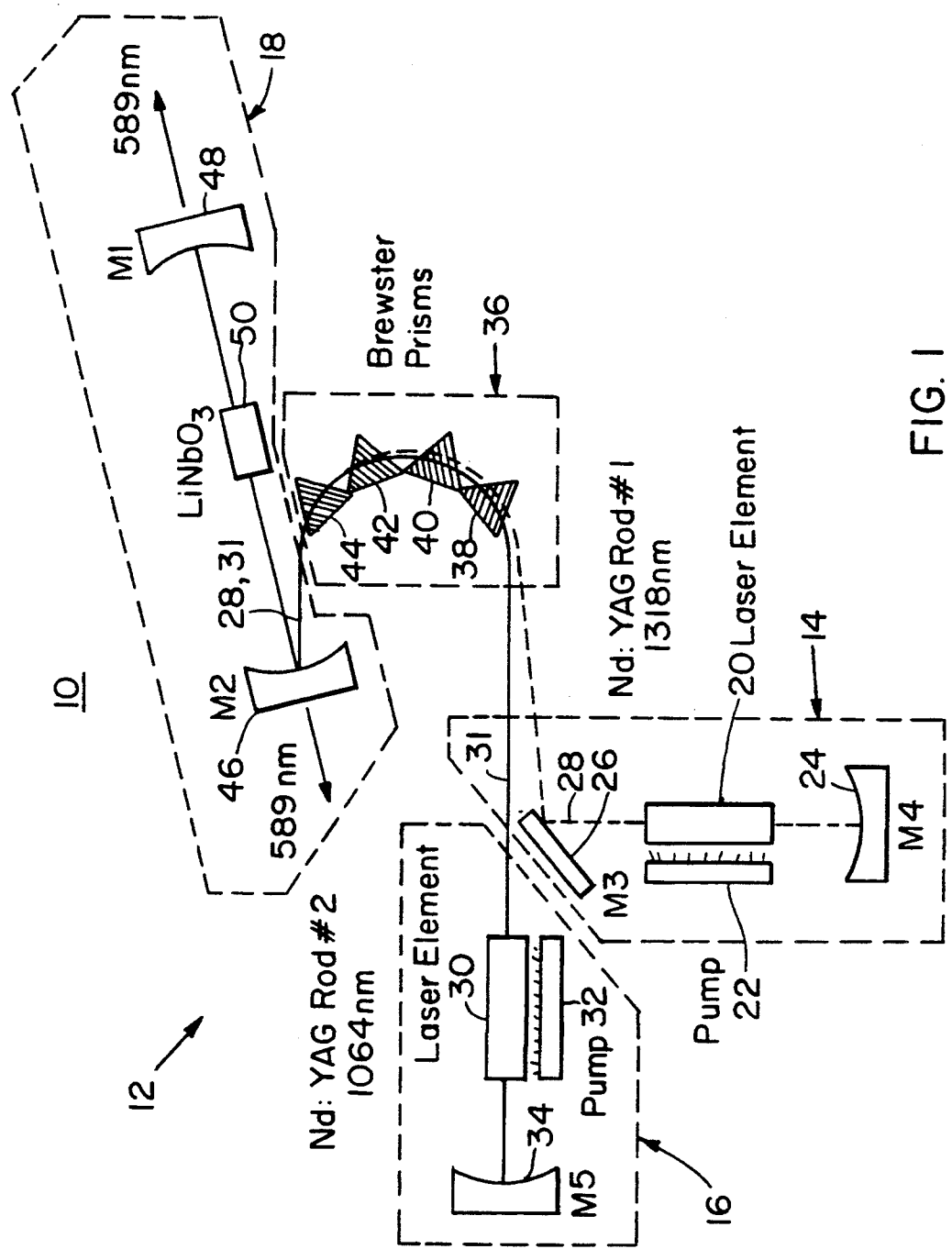

US005345457A

United States Patent [19]
Zenzie et al.

[11] Patent Number: 5,345,457
[45] Date of Patent: Sep. 6, 1994

[54] DUAL WAVELENGTH LASER SYSTEM WITH INTRACAVITY SUM FREQUENCY MIXING

[75] Inventors: Henry H. Zenzie, Chelmsford; Peter F. Moulton, Concord, both of Mass.

[73] Assignee: Schwartz Electro-Optics, Inc., Concord, Mass.

[21] Appl. No.: 137,947

[22] Filed: Oct. 15, 1993

Related U.S. Application Data

[63] Continuation of Ser. No. 12,520, Feb. 2, 1993, abandoned.

[51] Int. Cl.$^5$ .............................................. H01S 3/10
[52] U.S. Cl. ...................................... 372/22; 372/23; 372/92; 372/93; 372/97; 372/100; 372/69
[58] Field of Search ................................. 372/21–23, 372/97, 92, 100, 93, 99; 359/328

[56] References Cited

U.S. PATENT DOCUMENTS

| | | | |
|---|---|---|---|
| 3,855,547 | 12/1974 | Kick | 372/100 |
| 3,967,212 | 6/1976 | Dere et al. | 372/99 |
| 4,759,026 | 7/1988 | Hollins et al. | 372/23 |
| 5,060,233 | 10/1991 | Harder et al. | 372/22 |
| 5,084,879 | 1/1992 | Suzuki et al. | 372/22 |
| 5,142,542 | 8/1992 | Dixon | 372/22 |
| 5,144,630 | 9/1992 | Lin | 372/22 |
| 5,235,605 | 8/1993 | Rines et al. | 372/23 |

*Primary Examiner*—Léon Scott, Jr.
*Attorney, Agent, or Firm*—Joseph S. Iandiorio; Kirk Teska

[57] ABSTRACT

A dual-wavelength laser system with intracavity, sum-frequency mixing including a bifurcated resonant cavity having a first arm, a second arm and a common arm; a first laser element located in the first arm for providing a first input laser beam of a first wavelength; a second laser element located in the second arm for providing a second input laser beam of a second wavelength; a non-linear-mixing element in the common arm; and a beam combining device for combining the first and second beams and submitting them to the nonlinear-mixing element for providing an output laser beam of a third wavelength whose energy is the sum of the energy of the input laser beams.

18 Claims, 2 Drawing Sheets

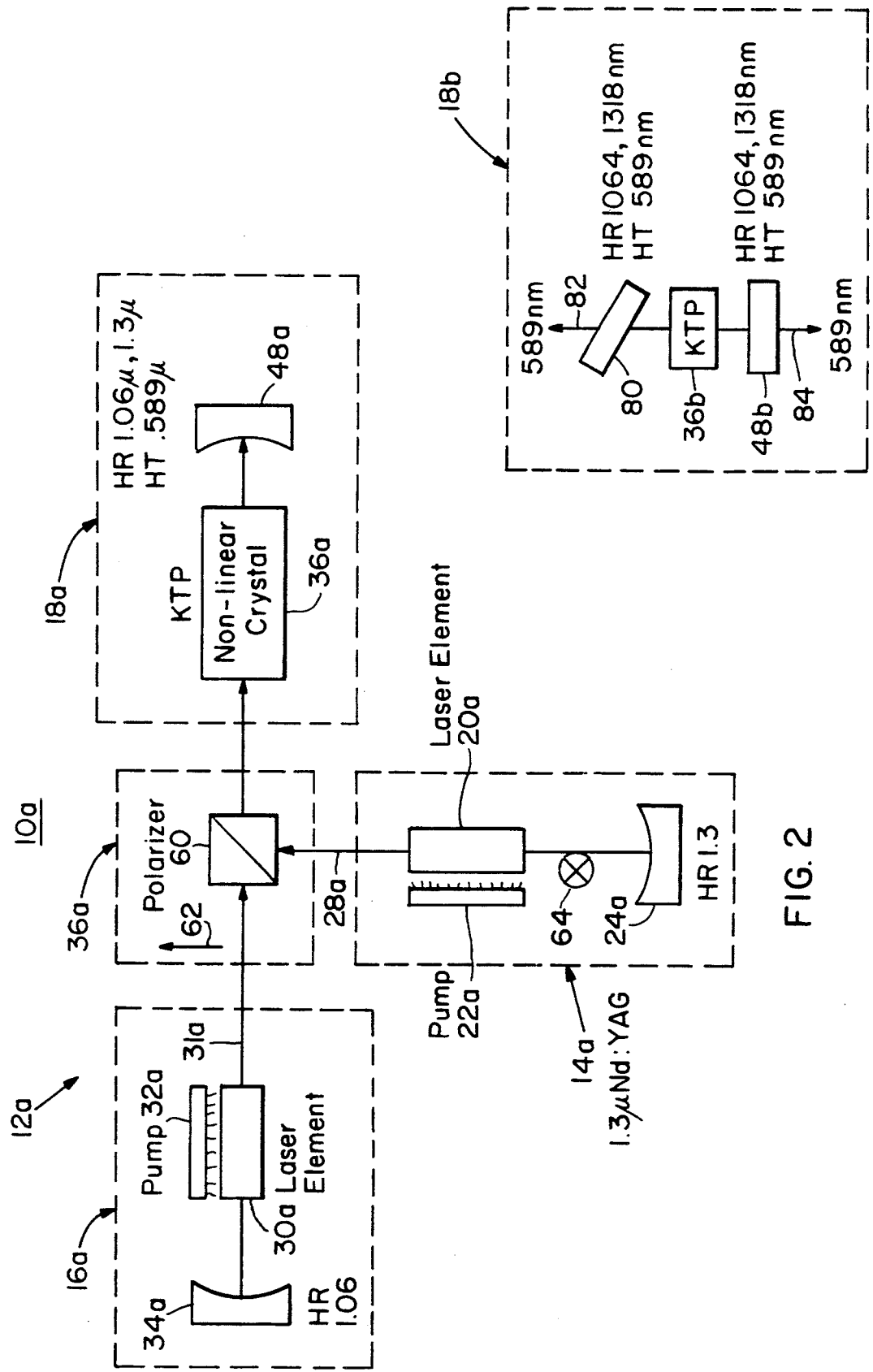

DUAL WAVELENGTH LASER SYSTEM WITH INTRACAVITY SUM FREQUENCY MIXING

STATEMENT ACKNOWLEDGING GOVERNMENT SUPPORT

This invention was made with government support under a grant, 1R43HL48397-01, awarded by the National Institutes of Health. The government has certain rights in the invention.

This is a continuation of application Ser. No. 08/012,520, filed Feb. 2, 1993, now abandoned.

FIELD OF INVENTION

This invention relates to a dual-wavelength laser system with intracavity, sum-frequency mixing and more particularly to such a laser system which uses infrared wavelengths to generate yellow light for vascular lesion removal.

BACKGROUND OF INVENTION

Removal of vascular lesions such as port wine stains from human skin can be accomplished by irradiation with yellow laser light at 589 nm. Presently, yellow light lasers are implemented by dye lasers which are complex, costly, result in toxic waste production and require long patient exposure times due to the low pulse repetition rate of the dye laser. A solid state source has been suggested which uses a dual-wavelength laser that simultaneously generates 1064 nm and 1318 nm light in a single laser crystal and includes a nonlinear-mixing crystal inside the resonator. However, this approach makes it difficult to separately control the energy at each of the wavelengths in order to safely and efficiently obtain the necessary optical energy, approximately 300 millijoules, at 589 nm. Such devices have this shortcoming whether the nonlinear crystal is contained within or without the laser cavity and in configurations with variously polarized infrared beams. Also, in such devices, the outputs are limited to the wavelengths at which the single laser crystal can function.

SUMMARY OF INVENTION

It is therefore an object of this invention to provide an improved dual-wavelength, solid state laser system with intracavity, sum-frequency mixing.

It is a further object of this invention to provide such a laser system which provides yellow light-output.

It is a further object of this invention to provide such a laser system which is less complex and less costly.

It is a further object of this invention to provide such a laser system which produces no toxic waste.

It is a further object of this invention to provide such a laser system which has higher pulse repetition rate and thus higher average power.

It is a further object of this invention to provide such a laser system which permits easy, accurate, and independent control of the energy at both infrared wavelengths.

It is a further object of this invention to provide such a laser system for use in the removal of vascular lesions.

It is a further object of this invention to provide such a laser system whose range of producible wavelengths is not limited to those produced in a single laser crystal.

The invention results from the realization that a safe and efficient dual-wavelength laser system with intracavity, sum-frequency mixing, suitable for producing yellow light for vascular lesion treatment, can be achieved by generating, combining and mixing two different wavelength beams from two different laser elements. The two input beams, which can be controlled independently, are mixed in a nonlinear crystal that produces an output beam whose energy is the sum of the energies of the two input beams.

This invention features a dual-wavelength laser system with intracavity, sum-frequency mixing including a bifurcated resonant cavity having a first arm, a second arm and a common arm. A first laser element located in the first arm provides a first input laser beam of a first wavelength, and a second laser element located in the second arm provides a second input laser beam of a second wavelength. A nonlinear-mixing element is disposed in the common arm. A beam combining device combines the first and second beams and submits them to the nonlinear-mixing element for producing an output laser beam of a third wavelength whose energy is the sum of the energy of the input laser beams. Since the nonlinear crystal is located inside the laser cavity, efficient mixing can be achieved without Q-switching the bifurcated laser cavity.

In a preferred embodiment, the first laser element may be a solid state element, or the second laser element may be a solid state element, or the first and second elements may both be solid state elements. They may both be the same material. Each of the laser elements may include a pumping device. The pumping device may be a flashlamp that emits a light pulse with a duration that may range from 50 to 400 microseconds. The first and second laser elements may include infrared lasers. The wavelengths of the infrared lasers may be 1064 nm and 1318 nm. The nonlinear-mixing element may be potassium titanyl phosphate (KTP), lithium triborate (LBO) or lithium niobate ($LiNbO_3$). The bifurcated cavity may include either a Brewster prism assembly or a dichroic mirror for combining the two parallel polarized input beams. The first and second beams may be orthogonally polarized and the beam combining device may be a polarizer element.

The invention also features a dual-wavelength, infrared laser system with intracavity, sum-frequency mixing for yellow-light generation for vascular lesion removal. There is a bifurcated resonant cavity having a first arm, a second arm and a common arm. A first solid, state infrared laser element is located in the first arm for providing a first input laser beam of wavelength near 1 micron, a second solid state, infrared laser element is located in the second arm for providing a second input laser beam of wavelength near 1.3 microns. A nonlinear-mixing element is disposed in the common arm. A beam combining device combines the first and second beams and submits them to the nonlinear-mixing element, which produces a yellow output laser beam whose energy is the sum of the energy of the input laser beams.

In a preferred embodiment the first wavelength may be approximately 1064 nm and the second 1318 nm, while the third yellow wavelength may be approximately 589 nm.

DISCLOSURE OF PREFERRED EMBODIMENT

Other objects, features and advantages will occur to those skilled in the art from the following description of a preferred embodiment and the accompanying drawings, in which:

FIG. 1 a schematic diagram of a dual-wavelength laser system with intracavity, sum-frequency mixing according to this invention;

FIG. 2 is a schematic diagram similar to that in FIG. 1 of an alternative embodiment of a dual-wavelength laser system with intracavity, sum-frequency mixing according to this invention; and FIG. 3 is an enlarged detail view of an alternative construction of the common arm of FIG. 2.

This invention may be accomplished with a dual-wavelength laser system with intracavity, sum-frequency mixing. There is a bifurcated resonant cavity having three arms: a common arm, and first and second split arms. A first laser element with a pump is located in the first arm and a second laser element with a pump is provided in the second arm. The two laser elements may be made of the same material, for example, solid state lasers made of Nd:YAG; or they may be different materials. For example, one may be Nd:YAG and another one may be Nd:YLF. Or they may be different types of lasers: one may be solid state and the other one a gas laser. Whatever the two lasers are, when their outputs are combined and sent to a nonlinear-mixing element, they will produce an output beam whose wavelength is a function of the combined energies of the two input beams. For example, if both laser elements are Nd:YAG, yellow light is produced by the mixing crystal when one element is operated at 1064 nm and the other is operated at 1318 or 1338 nm. If, instead of the Nd:YAG at 1064 and 1318 nm, a Nd:YLF at 1047 and 1321 nm is used, then a beam of yellow radiation at 584 nm is produced. Or, if a Nd:YAG laser operating at 1064 nm is used with a Cr:LiSAF laser operating at 800 nm, blue light at 456 nm is produced. Solid state lasers using this device may be pumped by flashlamps or diode lasers.

In one particular construction, the dual-wavelength lasers are infrared lasers operating in the 1064 and 1320 nm ranges so that yellow light at approximately 589 nm is produced for removing vascular lesions such as port wine stains from human skin. Alternatively, other Nd doped laser materials may be used. The nonlinear-mixing elements may be made from (but not restricted to) potassium titanyl phosphate (KTP), lithium niobate (LiNbO₃), lithium triborate (LBO), potassium dideuterium phosphate (KD*P), or magnesium oxide doped lithium niobate (MgO:LiNbO₃). The infrared beam combining device may include a dichroic mirror or a Brewster prism assembly when the polarization fields of the two input beams are the same. When the beams are orthogonally polarized, a polarizer element may be used as the beam combining device.

There is shown in FIG. 1 a dual-wavelength laser system 10 with intracavity, sum-frequency mixing including a bifurcated resonant cavity 12 comprising a first arm 14, a second arm 16, and a common arm 18. Arm 14 includes a laser element 20 such as Nd:YAG which lases at 1318 nm. A pump 22 such as a flashlamp or a laser diode is used to pump laser 20. Arm 14 also includes mirror 24 which is highly reflective at 1318 nm. Mirror 26 redirects the laser beam 28. Second arm 16 includes a similar laser 30 which produces beam 31. Laser 30 may also be made of Nd:YAG operated at 1064 nm by pump 32. Mirror 34 is highly reflective at 1064 nm and highly transmissive at 1318 nm. Mirror 24 is highly transmissive at 1064 nm and highly reflective at 1318 nm. A beam combining device 36 such as an assembly of Brewster prisms 38, 40, 42 and 44 combine the two beams 28 and 31 and deliver them both to the common arm 18 of the resonant cavity 12. The combined beams 28 and 31 exiting the Brewster prism 44 are received by mirror 46 which is highly reflective at 1064 nm and 1318 nm and highly transmissive at 589 nm. Mirror 48 has similar characteristics. Between mirrors 46 and 48 is a nonlinear-mixing element, such as LiNbO₃, 50, which combines the 1318 nm and 1064 nm beams to provide the 589 nm output. The nonlinear conversion which occurs in nonlinear-mixing element 50 is based on the fact that the energy in a photon E is equal to Planck's constant, h, times the speed of light c over the wavelength λ of the radiation:

$$E = \frac{hc}{\lambda} \tag{1}$$

This results in E being proportional to $1/\lambda$:

$$E \sim \frac{1}{\lambda} \tag{2}$$

In this case, $$E_{589} = E_{1064} + E_{1318} \tag{3}$$

Thus:

$$\frac{1}{1064} + \frac{1}{1318} = \frac{1}{589} \tag{4}$$

In operation, pump 22 energizes laser 20 so that the lasing action takes place from mirror 24 via mirror 26 through the Brewster prisms 38–44 and then to mirror 46 through nonlinear-mixing element 50 and finally to mirror 48 and then back again in the reverse direction along the same path. In contrast, laser 30 pumped by laser pump 32 establishes its pass through the cavity between mirror 34 (through Brewster prisms 38–44) and mirror 46 through nonlinear-mixing element 50 to mirror 48 and then back again in the reverse direction along the same path. In the Brewster prism assembly 36, the two beams are combined but not yet mixed. The mixing occurs in nonlinear-mixing element 50 in the common arm 18 of the resonant cavity 12. Since in this invention the two laser elements 30 and 20 are separate, they may be independently controlled so that the output energy can be precisely set. This is useful because, since there are two different wavelengths being combined, namely 1064 nm and 1318 nm, there are two different energy levels to contend with. A photon at 1064 nm will have higher energy than one at 1318 nm. Thus in order to achieve a one-to-one photon mix at the nonlinear crystal, more energy must be provided in 1064 nm laser element 30 than in the 1318 nm laser element 20. The energy breakdown is approximately 55%–45% respectively, between the 1064 nm and 1318 nm beams. By precisely controlling the energy in both arms of the cavity, a more efficient and reliable source of yellow light at 589 nm is provided. Controlling the energy ratio between the 1064 nm and 1318 nm beams in a single crystal is difficult because the stimulated emission cross section at 1318 nm is approximately a factor of five lower than 1064 nm. Other conventional optical elements may be added such as mode-lockers, Q-switches and the like. The system may be operated at other wavelengths as well. For example, the Nd:YAG rods may be operated at 1338 nm as well as 1318 nm, and at 1061 nm instead of 1064 nm, which will shift the 589 nm output by a small amount not critical to its function.

In another embodiment of the dual-wavelength laser system 10a with intracavity, sum-frequency mixing, FIG. 2, the beam combiner 36a may include a polarizer 60. In this case, laser element 30a provides output beam 31a polarized parallel to the paper as indicated by arrow 62, while laser element 20a provides radiation beam 28a polarized perpendicular to the plane of the paper as indicated by arrow 64. Thus polarizer 60 combines the two orthogonally polarized beams and submits them to the nonlinear-mixing element 36a in common arm 18a. In this embodiment, the nonlinear-mixing element 36a is implemented with potassium titanyl phosphate (KTP), which is compatible with the cross polarized combined beam received from polarizer 60. Lithium niobate (LiNbO3), which is used in implementing nonlinear-mixing element 50, FIG. 1, is in contrast suited to beams having the same plane of polarization.

Alternatively, as shown in FIG. 3, common arm 18b may include mirror 80 which redirects radiation through nonlinear crystal 36b to mirror 48b. In this configuration, the 589 nm yellow output is available at two ports, one at mirror 80 as indicated by arrow 82, and the other at mirror 48b as indicated by arrow 84.

Although specific features of this invention are shown in some drawings and not others, this is for convenience only as a feature may be combined with any or all of the other features in accordance with the invention.

Other embodiments will occur to those skilled in the art and are within the following claims:

What is claimed is:

1. A dual-wavelength laser system with intracavity, sum-frequency mixing comprising:
    a bifurcated resonant cavity having a first arm, a second arm and a common arm;
    a first laser element located in said first arm for producing a first laser beam of a first wavelength;
    a second laser element located in said second arm for producing a second input laser beam of a second wavelength;
    a nonlinear-mixing element in said common arm; and
    a beam combining device for combining said first and second beams and submitting them to said nonlinear-mixing element for producing an output laser beam of a third wavelength whose energy is the sum of the energy of the input laser beams.

2. The dual-wavelength laser system of claim 1 in which said first laser element is a solid state element.

3. The dual-wavelength laser system of claim 1 in which said second laser element is a solid state element.

4. The dual-wavelength laser system of claim 1 in which said first and second laser elements are the same material.

5. The dual-wavelength laser system of claim 1 in which each of said laser elements includes a pumping device.

6. The dual-wavelength laser system of claim 5 in which each said pumping device is a flashlamp.

7. The dual-wavelength laser system of claim 1 in which said first and second laser elements include infrared lasers.

8. The dual-wavelength laser system of claim 7 in which said first wavelength is 1064 nm and said second wavelength is 1318 nm.

9. The dual-wavelength laser system of claim 1 in which said nonlinear-mixing element is potassium titanyl phosphate (KTP).

10. The dual-wavelength laser system of claim 1 in which said nonlinear-mixing element is lithium niobate (LiNbO3).

11. The dual-wavelength laser system of claim 1 in which said nonlinear-mixing element is lithium triborate (LBO).

12. The dual-wavelength laser system of claim 1 in which said beam combining device includes a Brewster prism assembly.

13. The dual-wavelength laser system of claim 1 in which said beam combining device includes a dichroic mirror.

14. The dual-wavelength laser system of claim 1 in which said first and second beams are orthogonally polarized and said beam combining device is a polarizer element.

15. The dual-wavelength laser system of claim 14 in which said first wavelength is approximately 1064 nm.

16. The dual-wavelength laser system of claim 14 in which said second wavelength is approximately 1318 nm.

17. The dual-wavelength laser system of claim 14 in which said third wavelength is approximately 589 nm.

18. A dual-wavelength infrared laser system with intracavity, sum-frequency mixing for yellow light generation for vascular lesion removal, comprising:
    a bifurcated resonant cavity having a first arm, a second arm and a common arm;
    a first solid state H2 pfm infrared laser element located in said first arm for producing a first laser beam at approximately 1 micron;
    a second solid state H2 pfm infrared laser element located in said second arm for producing a second input laser beam at approximately 1.3 microns;
    a nonlinear-mixing element in said common arm; and
    a beam combining device for combining said first and second beams and submitting them to said nonlinear-mixing element for producing an output laser beam of a yellow wavelength whose energy is the sum of the energy of the input laser beams.

* * * * *